2,897,065

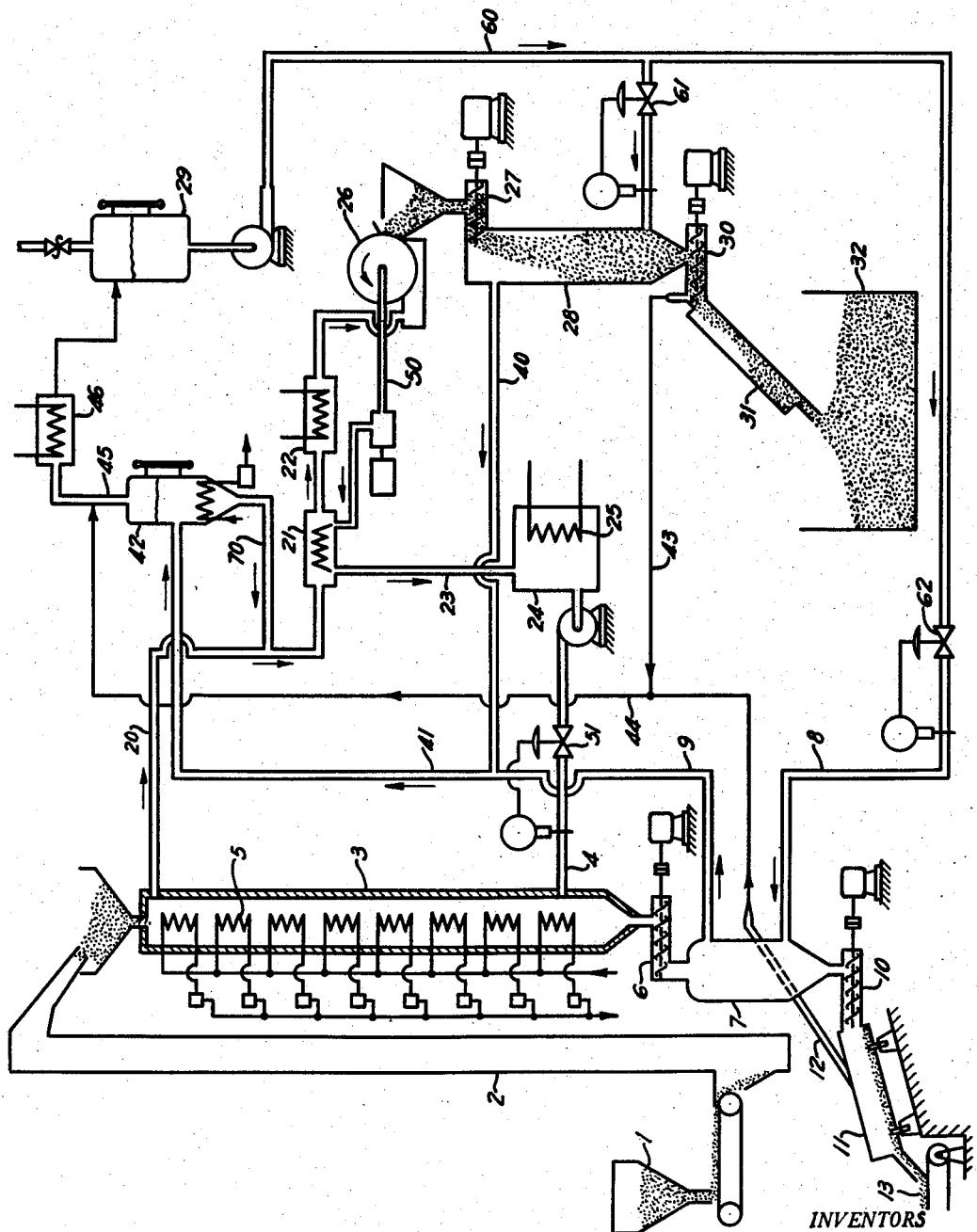
July 28, 1959  R. G. CAPELL ET AL  2,897,065
RECOVERY OF ELEMENTAL SULFUR FROM SULFUR
BEARING SOLID MINERAL MATTER
Filed June 18, 1956
INVENTORS
ROBERT G. CAPELL
JAMES H. WRIGHT +
BY  WILLIAM A. GRUSE.
THEIR ATTORNEY United States Patent Office 2,897,065
Patented July 28, 1959

RECOVERY OF ELEMENTAL SULFUR FROM SULFUR BEARING SOLID MINERAL MATTER

Robert G. Capell, Pittsburgh, James H. Wright, Verona, and William A. Gruse, Wilkinsburg, Pa., assignors to Gulf Research & Development Company, Pittsburgh, Pa., a corporation of Delaware Application June 18, 1956, Serial No. 592,124

8 Claims. (Cl. 23—312)

This invention relates to a process for recovery of elemental sulfur from sulfur-bearing solid mineral matter and relates more particularly to an extraction process for recovering elemental sulfur from sulfur-bearing mineral ores by contacting said ores with an elemental sulfur extraction agent.

In recent years the sulfur industry has witnessed a constantly increasing demand for elemental sulfur. This demand has resulted in efforts to recover sulfur from mineral ores and deposits which heretofore have been considered non-profitable.

One of the processes that can be applied to the recovery of elemental sulfur from mineral ores is the solvent extraction process. Of several sulfur solvents known, carbon disulfide has been proposed for extraction of sulfur. This solvent, however, is objectionable because of its high vapor pressure, inflammability and toxicity. Other objections to this solvent are that it is capable of producing explosive mixtures with air at temperatures of about 100° C. and that the losses of the solvent due to its high vapor pressure would probably represent a considerable increase in processing costs.

We have discovered in accordance with the invention that elemental sulfur can be recovered efficiently from sulfur-bearing solid mineral matter by contacting said matter with an organic polysulfide of the type defined below, and thereafter separating the organic polysulfide. We have found that the free sulfur in the solid mineral matter is largely removed by the organic polysulfides. Thus, by the process of our invention we can contact any elemental sulfur-bearing solid mineral material and recover substantially all the free sulfur therefrom.

As indicated in the foregoing brief description of the invention, the instant process is applicable to elemental sulfur-containing solid mineral matter and includes sulfur-bearing rocks, ores, gangues, spent gas works oxides, adsorbents, catalysts and the like. An example of a sulfur-bearing ore to which our process is applicable is that found in the Leviathan deposits in California. This ore averages about 25 to 35 percent of elemental sulfur. The extraction process of our invention is also suitable for desulfurizing and upgrading mineral ores which are valuable for other constituents besides elemental sulfur. In general, however, our invention is applicable to the recovery of elemental sulfur from mineral ores and is not limited by the amount of elemental sulfur present in the material being treated. Economic considerations will, of course, dictate the type of material that can be processed advantageously by our invention.

The mechanism by which the organic polysulfide molecules combine with or extract elemental sulfur is not fully understood, but it is believed that they form compounds or complexes with sulfur atoms. The number of sulfur atoms extracted per molecule of organic polysulfide depends on the number of sulfur atoms forming the organic polysulfide molecule. Thus, a disulfide, such as dithiodiglycol, has been found to extract from about one to about three sulfur atoms per molecule.

It is essential for the purpose of our invention that the treating materials be disulfides or higher, since the organic monosulfides exhibit little or no affinity for elemental sulfur at practical treating conditions.

The organic polysulfides used in the process of this invention in general may be represented by the formula $R_1$—$S_n$—$R_2$ where $R_1$ and $R_2$ are organic radicals and where $n$ is at least 2. The organic radicals attached to the —$S_n$— linkage may be aliphatic or aromatic and identical or dissimilar. The radicals may also contain substituents, unsaturated linkages and/or elements other than carbon and hydrogen including nitrogen, halogens, sulfur, oxygen or phosphorus, which do not materially interfere with the sulfur-combining properties of the polysulfide linkage. Of the various polysulfides, such as the aliphatic (including cycloaliphatic), aromatic or mixtures thereof, the aliphatic sulfides are usually preferred although the organic polysulfides in general possess a great capacity for taking up elemental sulfur.

Specific examples of polysulfides which are suitable for the purposes of this invention are organic disulfides such as diacetyl disulfide, dithiodiglycol, i.e., bis-(β-hydroxyethyl) disulfide, or 1,6-dihydroxy 3,4-dithiohexane, formamidine disulfide, thiuram disulfide, tetramethyl-thiuram disulfide, bis-(α-amino propionic acid) disulfide (cystine) and esters thereof, bis-(p-nitrophenyl) disulfide, dinitrobenzyl disulfide, dibenzoyl disulfide, diethyl disulfide, dipropyl disulfide, dibutyl disulfide, diphenyl disulfide and butyl phenyldisulfide; and organic trisulfides such as bis-(nitro-p-tolyl) trisulfide adn tetrasulfides corresponding to the di- and tri-sulfides mentioned above. Particularly preferred are the bis-(alkanol) disulfides, and especially those wherein the alkanol substituents contain 5 or less carbon atoms. Especially preferred are the bis-(alkanol) disulfides that are liquids at ordinary temperatures and pressures; dithiodiglycol being representative. Dithiodiglycol has the structural formula:

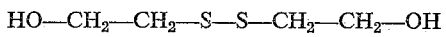

$$HO-CH_2-CH_2-S-S-CH_2-CH_2-OH$$

The compounds listed above are illustrative of the various classes of organic polysulfides which are effective as sulfur extraction agents in the process of our invention. Certain of the compounds are available commercially, for example dithiodiglycol, while the remainder can be prepared by well known methods. The synthesis of the various organic polysulfides therefore need not be discussed in detail since numerous procedures for their preparation have been described in the literature.

The bis-(alkanol) disulfides readily take up elemental sulfur at ordinary atmospheric pressures and achieve a high degree of sulfur removal from the material being treated. The temperature at which the disulfide and the sulfur-containing ore are contacted will depend in each instance on the nature of the particular extraction agent used. For dithiodiglycol, contact temperatures of from 20 to 95° C. are suitable. A preferred range of contact temperatures is from 80 to 95° C.

For those organic polysulfides which are solids at ordinary room temperatures, the treating temperatures, in general, should be below their boiling points and below temperatures which would cause a change in their molecular form, e.g., polymerization, decomposition, etc. In any case, the contact temperature should be sufficiently high to extract substantial quantities of elemental sulfur from the material being treated. Specific temperatures can be determined routinely by one skilled in the art.

Where the organic polysulfide is a solid and is soluble or miscible in a suitable solvent medium, a solution of such organic polysulfide can be used in a process according to our invention. Where the organic polysulfide is a liquid and also soluble or miscible in a solvent we can likewise adapt such a solution to the process of our invention. Treating conditions, such as contact temperatures, can be determined on the basis of the solubility of the organic polysulfide in the particular medium chosen and on the extraction efficiency of the solution. Regardless of whether the organic polysulfide is used in solution or alone as an extraction agent in the process of our invention, the contact temperature employed should be sufficiently high for substantial extraction of elemental sulfur from solid materials containing it.

The contact time required for the organic polysulfides to extract substantial amounts of elemental sulfur from a sulfur-containing ore is in general a function of the particle size of the ore, the amount of agitation and the treatment temperature. Thus, when dithiodiglycol is used, contact times in the order of about 5 to 30 minutes are required for particle sizes of from .02 to 0.2 inch at a processing temperature of 95° C. Longer contact times are accordingly necessary for ores of greater particle size. The size of the ore particles is not critical, although it should be understood that ore particles of sizes greater than 0.5 inch in general require longer contact times for efficient extraction of elemental sulfur therefrom. Because the extraction agents tend to become viscous on addition of elemental sulfur, the extraction efficiency is considerably increased by agitation.

It will be understood that the ratio by weight of the organic polysulfide to that of the sulfur-bearing material will vary with the particular extraction agent used and the percent of elemental sulfur present in the material. Dithiodiglycol, for example, can be used in ratios of about 0.1 to 4.0 unit weight of the solvent per unit weight of the ore. In any case, sufficient organic polysulfide should be used to extract the desired amount of the elemental sulfur present in the solid material.

In the treatment of a sulfur-bearing solid material according to the process of our invention the sulfur-rich organic polysulfide, after contact with the sulfur-bearing material, is separated therefrom by any suitable means. Thus, when dithiodiglycol is used as the extraction agent, it can be separated by decantation or centrifuging from the contacted ore particles.

In the actual practice of our invention using our preferred extraction agent we have extracted substantially all elemental sulfur from a sulfur-bearing Leviathan ore by contacting the ore with dithiodiglycol at temperatures of from 80 to 95° C. under conditions causing substantial saturation of the agent with elemental sulfur. The sulfur-rich material was separated from the mixture and cooled to temperatures of from 0 to 20° C. On cooling to these latter temperatures crystals of elemental sulfur precipitated from the dithiodiglycol solution. The crystals were recovered and the lean agent heated and contacted with additional Leviathan ore whereupon the process of sulfur extraction was repeated.

In another aspect of our invention after contacting a Leviathan ore with dithiodiglycol at temperatures of from 80 to 95° C. under conditions to cause substantial saturation with elemental sulfur, cooling at 0 to 20° C. and separating the precipitated sulfur, we have recovered additional elemental sulfur from the lean glycol by contacting it with a solutizer for the dithiodiglycol sulfur-complex, and thereafter causing the precipitation of elemental sulfur from the mixture by the addition of a liquid immiscible with the mixture. As solutizers there can be used any of the alkyl ketones that are soluble in water, acetone being especially preferred. Water has been found to be a satisfactory agent for precipitating sulfur from the extracts. After recovery of the additional precipitated sulfur crystals the lean dithiodiglycol was separated from the solution, heated and recycled for further sulfur extraction.

We have found that dithiodiglycol readily extracts up to three sulfur atoms per molecule to become substantially saturated with respect to elemental sulfur at temperatures of about 80 to 95° C. Upon cooling to about 0 to 20° C., however, about one sulfur atom is precipitated as crystals. On heating the lean dithiodiglycol to the higher temperature it will extract additionally about one atom of elemental sulfur on contact with the ore particles. Accordingly, a preferred embodiment of our invention consists in operating a continuous sulfur extraction process by a two stage hot and cold cycle.

In this embodiment of our invention advantageous results can be obtained by causing substantially complete saturation of the dithiodiglycol with elemental sulfur. Less than substantial saturation decreases the amount of sulfur recovery per cycle since dithiodiglycol retains about two atoms of extracted sulfur per molecule at 20° C.

Favorable operating conditions for the complete saturation of the dithiodiglycol with elemental sulfur include small ore particles, extraction temperatures of about 95° C., agitation, and in addition, a catalyst to aid in the extraction of sulfur. Thus, if the reaction mixture is blanketed with ammonia and agitated, the sulfur will combine with the dithiodiglycol more readily. This catalyst, however, does not cause an increase in amount of sulfur taken up by dithiodiglycol.

When the dithiodiglycol has become substantially saturated with elemental sulfur, the solution is cooled to cause precipitation of sulfur. The precipitated sulfur is then separated by any suitable means and the lean dithiodiglycol is recycled for further sulfur extraction. The extracted material, i.e., the treated ore, can be washed with a solvent for dithiodiglycol in order to recover it from the surface or the pores of the material, and the ore can then be disposed of or treated to recover other valuable constituents if any.

In the operation of a continuous process for extracting elemental sulfur from mineral ores according to the preferred embodiment of our invention we can recover additional amounts of sulfur from the partially regenerated dithiodiglycol from the low temperature cycle by treating it with additional components. We have found that by contacting the dithiodiglycol with from 0.2 to 2.0 volumes of acetone and then with from 0.1 to 1.0 volume of water additional mounts of elemental sulfur are precipitated. It is believed that the acetone acts as a solutizer for the dithiodiglycol sulfur complex and that this complex is broken on the addition of water to cause the precipitation of the sulfur present. Upon recovery of the sulfur crystals, the mixture can be treated as follows to separate the various components: (1) vacuum flashing to remove the water and acetone from the dithiodiglycol followed by (2) distillation to separate the acetone from the water. The regenerated dithiodiglycol can then be recycled for further contact with fresh sulfur-containing ore.

The following specific examples further illustrate the effectiveness of the organic polysulfides of our invention in the extraction of elemental sulfur from sulfur bearing mineral ores.

In the specific examples to be given below the sulfur-bearing mineral ore is a Leviathan ore which is representative of the sulfur-bearing mineral matter that can be treated in accordance with our invention. A typical analysis of one ore is given in Table I below.

TABLE I

|  | Percent |
|---|---|
| Total sulfur | 30 |
| Elemental sulfur | 25 |
| Insolubles | 55 |
| Iron | ≈5.5 |
| Copper | ≈0.4 |
| Moisture | ≈7.0 |

Specific gravity=2.1.

EXAMPLE I

A Leviathan ore containing approximately 30% elemental sulfur was ground to a size passing No. 14 mesh and retained on 20 mesh and 34.5 grams of it were mixed with 63 grams of dithiodiglycol in a suitable receptacle. The receptacle was placed in a constant temperature bath for 24 hours at a temperature of 95° C. The contents were stirred periodically during this period. The ore and solvent were then separated by filtration and the solvent was cooled to 5° C. The crystals of sulfur which precipitated were separated and identified as sulfur by X-ray diffraction pattern. Table II below shows the extraction data.

TABLE II
*Ore balance*

| | Initial | | Final | | Sulfur removed, weight | Extraction efficiency, percent |
|---|---|---|---|---|---|---|
| | Percent | Weight, grs. | Percent | Weight, grs. | | |
| Sulfur | 36.09 | 12.4 | 4.01 | 0.9 | 11.5 | 93 |
| Non-sulfur | 63.91 | 22.2 | 95.99 | 22.2 | | |
| | 100.00 | 34.6 | 100.00 | | | |

Note in the table above the high extraction efficiency of 93% obtained.

EXAMPLE II

In order to determine the relative effect of contact time on the extraction efficiency of dithiodiglycol a 50 gram sample of finely ground Leviathan ore was contacted with 75 grams of dithiodiglycol in a constant temperature bath for 20 minutes at 95° C. The sample was stirred at short intervals and at the end of the reaction time the materials were separated as in Example I above. The following results were obtained:

TABLE III
*Leviathan ore*

| | Initial | | Final | | Sulfur extraction, weight | Extraction efficiency, percent |
|---|---|---|---|---|---|---|
| | Percent | Weight, grs. | Percent | Weight, grs. | | |
| Sulfur | 40.85 | 20.4 | 15.60 | 5.4 | 15.0 | 75 |
| Non-sulfur | 59.15 | 29.6 | 84.40 | 29.6 | | |
| | 100.00 | 50.00 | 100.00 | | | |

In the above experiment the extraction efficiency of 75% may have been due to the fact that a sample of dithiodiglycol containing approximately 8% of impurities was used. Nevertheless, the experiment shows that the process of our invention is adaptable to short contact times.

EXAMPLE III

The capacity of dithiodiglycol for elemental sulfur was determined at two temperatures by the following procedure: Four samples of dithiodiglycol were weighed out and numbered from 1 to 4. Sufficient elemental sulfur was added to each sample to exceed slightly (a) one atom per molecule of dithiodiglycol in sample 1, (b) two atoms per molecule in sample 2, and (c) three atoms per molecule in samples 3 and 4. Sample 4 was blanketed with an atmosphere of ammonia. The samples were then heated at 80° C. for 25 hours with agitation. At the end of the reaction period, the samples were filtered to remove the insoluble material, and a sulfur analysis on the hot filtrate was carried out. Following this, the filtrates were cooled to 25° C. during which time sulfur crystals precipitated. The samples were again filtered to remove the precipitated sulfur and then analyzed for sulfur. The data for this experiment is shown in Table IV below:

TABLE IV

| Item | Samples | | | |
|---|---|---|---|---|
| (a) Weight of dithiodiglycol (gms.) | 32.0875 | 36.0544 | 39.1237 | 39.3452 |
| (b) Weight of sulfur added (gms.) | 6.9978 | 18.2564 | 27.4510 | 25.5734 |
| (c) Weight of undissolved sulfur (gms.) at 80° C | 0.0000 | 0.0000 | 4.9266 | 3.7047 |
| (d) Weight of dissolved sulfur (gms.) at 80° C | 6.9978 | 18.2564 | 22.5244 | 21.8687 |
| (e) Gms. of sulfur taken up per 100 g. of dithiodiglycol at 80° C | 21.8 | 50.6 | 57.6 | 58.2 |
| (f) Atoms of sulfur dissolved per molecule of dithiodiglycol at 80° C | 1.05 | 2.44 | 2.77 | 2.81 |
| (g) Weight of undissolved sulfur (gms.) at 25° C | 0.0000 | 4.8841 | 13.2412 | 11.4305 |
| (h) Weight of dissolved sulfur (gms.) at 25° C | 6.9978 | 13.3723 | 14.2098 | 14.1429 |
| (i) Gms. of sulfur soluble/100 g. of dithiodiglycol at 25° C | 21.8 | 37.0 | 36.4 | 36.0 |
| (j) Atoms of sulfur dissolved per molecule of dithiodiglycol at 25° C | 1.05 | 1.78 | 1.76 | 1.74 |

The ammonia atmosphere used in sample 4 caused a more rapid take up of sulfur than corresponding sample 3, but the final concentration of sulfur in dithiodiglycol at both 80° C. and 25° C. was unaffected.

From Table IV above, the following should be noted: (1) The capacity of dithiodiglycol for sulfur is approximately three atoms per molecule at 80° C. (item f). (2) Converted to grams, the capacity of 100 grams of dithiodiglycol for elemental sulfur at 80° C. is about 58 grams, i.e., well over 50 percent of its weight. (3) On cooling samples 3 and 4 to 25° C., each precipitated over 1 atom of elemental sulfur, or about 21 to 22 grams per 100 g. of solvent. Thus:

| Temp. | Atoms of sulfur per molecule of dithiodiglycol | | Gms. of sulfur/100 gms. dithiodiglycol | |
|---|---|---|---|---|
| | Sample 3 | Sample 4 | Sample 3 | Sample 4 |
| 80° C | 2.77 | 2.81 | 57.6 | 58.2 |
| 25° C | 1.76 | 1.74 | 36.4 | 36.0 |
| | 1.01 | 1.07 | 21.2 | 22.2 |

The above data are significant in the operation of a two-stage high and low temperature cycle in the extraction of elemental sulfur from mineral ores.

A commercial plant for recovering elemental sulfur from mineral ores containing it and employing dithiodiglycol as the extraction agent is illustrated diagrammatically in the attached drawing.

In a large scale application of our process, a sulfur-bearing ore such as a Leviathan ore, or an ore which would be upgraded by sulfur removal, is passed from storage through ore reduction and sizing equipment (not shown) where a uniform material of about ⅛ to ½ of an inch is produced. The sized ore accumulated in storage bin 1 is fed at the desired rate to isothermal contactor 3 via vertical lift 2 while dithiodiglycol is introduced to the column from line 4. In the isothermal contactor the dithiodiglycol, at operating temperatures of 80 to 95° C., strips the sulfur from the ore. The time required for this stripping is dependent on the particle size of the ore, ⅛ inch particles requiring only a few minutes. The desired stripping temperature is maintained in the column by steam heating coils 5. The desulfurized ore is removed from the bottom of the column or contactor by a screw conveyor 6 and carried to vessel 7 where occluded dithiodiglycol is removed from the ore by washing with acetone introduced by line 8. Foul acetone is removed from vessel 7 by line 9 and the reduced and washed ore is carried by means of a screw conveyor 10 to drying kiln 11 where the remaining acetone is vaporized and removed by line 12. The acetone-containing ore particles from kiln 11 can, alternatively, be washed or steamed to remove the acetone and the latter recovered by distillation. The dry and stripped ore then leaves the desulfurization unit on a horizontal conveyer 13 for further processing or disposal.

The sulfur-rich dithiodiglycol is taken from the contactor through line 20 to heat exchanger 21 and cooling unit 22 after which its temperature is between 5–20° C. If the dithiodiglycol has not become substantially saturated with sulfur it can be by-passed through line 23 to surge tank 24 and recycled to the isothermal unit by means of line 4. The dithiodiglycol in surge tank 24 is heated to the desired temperature by steam coils 25. The cooled dithiodiglycol from cooling unit 22 is taken to vacuum filter 26 where the precipitated sulfur crystals are removed. The crystals are conducted by screw conveyer 27 to column 28 where they are washed with acetone from surge tank 29 to remove occluded dithiodiglycol. The washed sulfur is carried through screw conveyor 30 to drying kiln 31 and storage vessel 32.

The foul acetone from the column 28 is taken by line 40 and combined in line 41 with the acetone from vessel 7 and then led to acetone flash still 42. Acetone vaporized from the washed sulfur crystals in drying kiln 31 and from the washed ore particles in kiln 11 is taken by lines 43 and 12, to line 44 and then to vapor line 45 from acetone flash still 42. The flash tower is operated at approximately 70° C. and 5–8 p.s.i.g. The vapors are condensed in acetone condenser 46 and taken to surge tank 29.

The lean cool dithiodiglycol leaving vacuum filter 26 is taken by line 50 and pumped through heat exchanger 21 to line 23 and dithiodiglycol surge tank 24. From the surge tank it is pumped to the isothermal contactor through a flow control valve 51 which establishes a fixed ratio between the fresh ore and the lean solvent.

In the acetone cycle, the clean solvent is pumped from surge tank 29 through line 60 to flow control valves 61 and 62 leading respectively to washing column 28 and washing vessel 7. As noted, acetone containing dithiodiglycol in solution from ore washing vessel 7 and sulfur washing column 28 is passed to acetone flash still 42 where the dithiodiglycol is separated. The dithiodiglycol leaves the bottom of the unit through line 70 and is combined with the sulfur-rich extractant from line 20 on its way to the heat exchanger 21 and cooler 22.

In a commercial plant such as that described above, processing, say, ten tons per hours of an ore containing 30 percent elemental sulfur, about 40 to 50 gallons of dithiodiglycol is circulated per minute on a high and low temperature cycle, to obtain about 5600 lbs. of elemental sulfur per hour. The acetone circulation in such a plant is approximately 50 to 65 gallons per minute.

Specific advantages of the organic polysulfide extraction agents of our invention are the high solvency, selectivity and physical properties of these compounds for elemental sulfur. For example, dithiodiglycol was found to selectively extract only elemental sulfur from a Leviathan ore. In addition, it has a high extraction capacity for sulfur, is non-explosive, and its low vapor pressure reduces evaporation losses to a minimum and permits the use of low pressure materials of construction in commerical processing plants.

The above specific examples illustrate a process for recovering elemental sulfur from sulfur bearing solid mineral matter. The process, however, is also applicable to the recovery of elemental sulfur from sulfur-containing gases.

Substantially complete removal of elemental sulfur from sulfur-containing industrial gases is practically impossible employing previously known means. For example, even though extreme care is employed to remove the sulfur from the tail gas from the Claus and similar processes for converting hydrogen sulfide to sulfur, such gases in many instances may contain up to about 1 percent by weight or more of sulfur. In the distillation of pure sulfur and sulfur ores and in ore smelting processes including the smelting of copper and other sulfide ores, the exit gases may contain up to about 20 percent by weight or more of sulfur dust. Obviously, the escape of sulfur in such amounts into the atmosphere creates a serious biological hazard. The loss of sulfur into the atmosphere is also undesirable from an economic standpoint. By treating such sulfur-containing gases with an organic polysulfide, the sulfur content can be reduced to as little as 0.1 percent by weight or less depending upon the efficiency of the contacting means.

In removing sulfur from sulfur-containing gases, we prefer those organic polysulfides within the structural formula shown hereinabove having a low vapor pressure. We advantageously utilize an organic polysulfide boiling above about 340° C. at atmospheric pressure. While organic polysulfides boiling below this temperature can be employed, such polysulfides are more easily vaporized thus giving rise to loss of the sulfur extractant.

By way of illustrating the process, tail gas from a modified Claus plant containing up to about 1 percent by weight of sulfur is cooled to a temperature between about 20° and about 100° C. While maintaining the tail gas at a temperature within this range, the gas is intimately contacted with an organic polysulfide. Dithiodiglycol boiling at about 350° to 360° C. at atmospheric pressure is particularly advantageous. When 1,000,000 cubic feet of tail gas containing 1 percent by weight of sulfur dust is intimately contacted with dithiodiglycol, the dithiodiglycol required to effect substantially complete removal of the sulfur dust is about 50 gallons.

Contacting of the sulfur-containing gas can be accomplished in any conventional contacting means including a bubble-cap absorption column, a packed absorption column, a counter-flow spray tower and a counter-current wetted wall column. After the sulfur content of the gas is reduced to a desired level, the gas can be disposed of in any desired manner. The dithiodiglycol can be recycled until further sulfur removal becomes practically impossible or at least economically undesirable.

The sulfur is recovered from the dithiodiglycol-sulfur stream by cooling the stream to cause precipitation of the sulfur. Additional recovery of sulfur from the lean dithiodiglycol can be accomplished by employing a solutizer as described hereinabove in connection with the embodiment directed to sulfur recovery from sulfur-bearing solid mineral matter. The dithiodiglycol can then be recycle for further sulfur removal. The sulfur can be removed from the sulfur-containing stream more readily if the reaction takes place in the presence of ammonia or an amine such as diphenylamine, triethanolamine, hexamethylenediamine and the like.

While we have described our invention with reference to certain embodiments, resort may be had to such modifications and variations that fall within the spirit of the invention and the scope of the appended claims.

We claim:

1. An extraction process for the recovery of elemental sulfur from solid mineral matter containing it which comprises contacting the mineral matter with a liquid bis-(alkanol) disulfide to form a solution of sulfur in the disulfide, and thereafter cooling the solution to precipitate elemental sulfur therefrom.

2. A process for recovering elemental sulfur from solid mineral matter which comprises contacting said ore with dithiodiglycol and thereafter separating the resulting dithiodiglycol-sulfur containing solution from the extracted ore.

3. A process for extracting elemental sulfur from solid mineral matter containing it which comprises contacting the mineral matter with dithiodiglycol at an elevated temperature followed by cooling to a lower temperature and recovering the elemental sulfur precipitated from the cool mixture.

4. A process for recovering elemental sulfur from solid mineral matter containing it which comprises contacting said mineral matter with dithiodiglycol at a temperature of about 80° to 95° C. to form a solution of sulfur in the dithiodiglycol, cooling the solution to from 5° to 20° C., and separating the elemental sulfur precipitated from the mixture.

5. A process for recovering elemental sulfur from solid mineral matter containing it which comprises contacting said mineral matter with dithiodiglycol at an elevated temperature to form a solution of sulfur in the dithiodiglycol, cooling the solution to precipitate elemental sulfur, adding a water soluble alkyl ketone to the lean dithiodiglycol, and precipitating sulfur from the resulting solution.

6. A process for recovering elemental sulfur from solid mineral matter containing it which comprises contacting said mineral matter with dithiodiglycol at a temperature of from 80° to 95° C., cooling the mixture to from 5° to 20° C. to precipitate elemental sulfur, separating the precipitated sulfur, and thereafter recovering additional elemental sulfur from the lean dithiodiglycol by contacting it with acetone.

7. A process for recovering elemental sulfur from solid mineral matter containing it which comprises contacting said mineral matter with dithiodiglycol at a temperature of from 80° to 95° C., cooling the mixture to from 5° to 20° C. to precipitate elemental sulfur, separating the precipitated sulfur, and thereafter recovering additional elemental sulfur from the lean dithiodiglycol by contacting it with acetone and then with water.

8. A continuous process for recovering elemental sulfur from solid mineral matter containing it which comprises contacting said mineral matter with dithiodiglycol at a temperature of from 80° to 95° C., separating the solid matter from the dithiodiglycol, cooling the dithiodiglycol to from 5° to 20° C. to precipitate elemental sulfur, recovering said sulfur, heating the dithiodiglycol to a temperature of from 80° to 95° C., and recycling it for contact with more solid mineral matter.

References Cited in the file of this patent

UNITED STATES PATENTS

| | | |
|---|---|---|
| 1,963,921 | Nagelvoort | June 19, 1934 |
| 2,001,715 | Fischer | May 21, 1935 |
| 2,195,870 | Rosen | Apr. 2, 1940 |
| 2,521,870 | Proell | Sept. 12, 1950 |

FOREIGN PATENTS

| | | |
|---|---|---|
| 342,611 | Great Britain | Feb. 5, 1931 |
| 430,110 | Great Britain | June 13, 1935 |